United States Patent [19]
Hedin
[11] 3,708,783
[45] Jan. 2, 1973

[54] INTERCHANNEL TIME DISPLACEMENT CORRECTION METHOD AND APPARATUS

[75] Inventor: Jan S. Hedin, Mountain View, Calif.
[73] Assignee: Ampex Corporation, Redwood City, Calif.

[22] Filed: June 18, 1971
[21] Appl. No.: 154,420

[52] U.S. Cl....340/146.1 D, 179/15 BS, 340/146.1 F
[51] Int. Cl. ..............................................G08c 25/00
[58] Field of Search..340/146.1 D, 146.1 F, 174.1 A, 340/174.1 B; 178/69.5 R; 179/15 BS, 15 BW

[56] References Cited

UNITED STATES PATENTS

| | | | |
|---|---|---|---|
| 3,475,559 | 10/1969 | Ringelhaan | 179/15 BS |
| 3,482,048 | 12/1969 | Tadada et al | 179/15 BY |
| 3,546,384 | 12/1970 | Brigham | 179/15 BS |
| 3,602,647 | 8/1971 | Kawashima | 179/15 BS |

*Primary Examiner*—Charles E. Atkinson
*Attorney*—Robert G. Clay

[57] ABSTRACT

Associated digital data in a plurality of parallel data channels and a unique digital sync word successively repeated in one more parallel channel are exchanged without a change in data clock so that the digital data and repeated digital sync word are sequentially distributed in each of the data and sync channels. The parallel channels of distributed digital data and sync words are transmitted to a receiving station wherein the unique sync words are detected and any interchannel time displacement errors introduced by the transmission system eliminated by electronically correlating the time between the sync words in the parallel channels. Following correlation, the digital data and sync words in each channel are separated and redistributed in the data channels and sync channel as they were originally.

11 Claims, 8 Drawing Figures

INVENTOR.
JAN S. HEDIN
BY Ralph L. Mossino
ATTORNEY

INVENTOR.
JAN S. HEDIN
BY Ralph L Mossino
ATTORNEY

INVENTOR.
JAN S. HEDIN
BY Ralph L. Mossino
ATTORNEY

INVENTOR.
JAN S. HEDIN
BY Ralph L. Mossino
ATTORNEY

INTERCHANNEL TIME DISPLACEMENT CORRECTION METHOD AND APPARATUS

The invention herein described was made in the course of a contract with the Department of the United States Air Force.

FIELD OF THE INVENTION

The present invention relates to interchannel time displacement correction. More particularly, it relates to an improved technique of distribution and separation of digital data and digital sync words in a multichannel data transmission system for effecting interchannel time displacement correction.

BACKGROUND OF INVENTION

Many data transmission applications, especially those using computer processing of data recorded on tape, require the simultaneous (parallel track) recording and reproduction of the bits of a digital word. This technique has been used for a long time at densities up to 3,000 bits per inch of track length. But the requirements for higher information rates and, consequently, higher digital data rates, demand densities exceeding 20,000 bits per inch of track in order to record and reproduce the information at reasonable tape speeds.

At these high densities and reasonable tape speeds of, for example 120 inches per second (ips), the recorded bit length is far less than the static skew (i.e., a permanent angular error produced by fixed misalignment or azimuth differences between the head gap lines of the recording and reproducing magnetic heads of a multitrack head assembly) and dynamic skew (i.e., a changing angular error produced by imperfect guiding of the tape as it passes the head assemblies). These skew errors cause an interchannel time displacement of the bits of a digital word simultaneously recorded along the parallel tracks of a recorder. Often the bits of a particular word will be displaced by many bit periods. Under such conditions, the simultaneously recorded bits of a digital word cannot be reproduced within a fraction of a bit period as required in computer processing of data.

Electronic bit alignment methods are employed to eliminate the interchannel time displacement errors by time correlating the bits reproduced from the parallel tracks and, thereby, compensate for the effects of skew. With electronic bit alignment, it is possible to record and precisely reproduce high-rate digital data. Common electronic bit alignment methods involve inserting a unique digital sync word at regular intervals in each of the parallel streams of data that is to be recorded along a separate track. The insertion or multiplexing of the digital sync word in each of the streams is synchronized to the multiplexing in the other streams so that the relative times of occurrences of the sync words in all the streams are known and can be determined from any sync word located in any one of the streams. Upon reproduction, the streams are examined for the sync words and the digital bits in the streams time displaced to align the sync words of the parallel streams in their original relative time positions prior to recording. Following the electronic bit alignment, the sync words are separated from the streams of digital bits and the digital data restored to their original form in their original channels.

Heretofore, customary data compression techniques have been used to multiplex the data and sync words in each of the streams so that sync words can be added in the data channels without loss of data. This has been achieved by increasing the data clock rate to compress the data and inserting the sync word in the time interval made available by the data compression. While such data compression techniques are common, they require complex and expensive systems and memories in the electronic bit alignment apparatus that have very large capacities. This is especially characteristic of data transmission applications requiring the simultaneous processing of associated streams of high density (i.e., tens of million bits per second) data. Considerable advantage is therefore to be gained by obviating the change of data clock when multiplexing digital data and digital sync words for interchannel time displacement correction purposes in systems for processing a plurality of streams of associated digital data.

SUMMARY OF INVENTION

Accordingly, it is an object of this invention to simplify interchannel time displacement correction techniques in multichannel data processing systems.

More particularly, it is an object of this invention to obviate data compression necessary in the more customary techniques of multiplexing data and sync words for interchannel time displacement correction purposes.

Another object of this invention is to avoid changing the data clock rate during the processing of associated data included in a plurality of parallel channels to effect interchannel time displacement corrections.

A further object of this invention is to provide a simple and inexpensive interchannel time displacement correction technique that facilitates the recording and precise reproduction of high-rate data along parallel tracks of a magnetic tape.

In accordance with the present invention, associated digital data, usually in the form of digital words consisting of binary bits, distributed in n parallel data channels and a unique digital sync word, in the form of a particular sequence of binary bits, successively repeated in one more parallel channel are distributed over $(n+1)$ channels preparatory to the simultaneous transmission of the parallel channels of data to a receiving station. The channels of digital data and repeated digital sync words are sequentially distributed in each of the $(n+1)$ channels without a change in data clock rate, with the unique digital sync word inserted sequentially in the $(n+1)$ channels. At the receiving station, each of the channels of distributed digital data and sync words are examined for the unique digital sync word and the relative times of the occurrences in each channel determined. If interchannel time displacements of the parallel bits of digital data has occurred, the relative times of occurrences of the sync words in the channels are other than they were prior to transmission. Any interchannel time displacements are eliminated by relatively time displacing the digital data and sync words in the channels to align the sync words of the parallel channels in their original relative time positions prior to transmission. Following the electronic bit alignment, the sync words are separated from the channels of digital data and the digital data redistributed to their original channels in their original form.

Apparatus for performing these operations are illustrated in the accompanying drawing and will be described in detail hereinbelow. As will become apparent from the detailed description, the correction of interchannel time displacements is greatly facilitated by providing an extra parallel channel or channels for data transmission and distributing the data with added sync words over the increased number of $(n + m)$ parallel channels, where $m$ is the number of extra parallel channels provided for distributing the data and sync words. The provision of the additional channel or channels obviates the change of data clock rates necessary of the more customary methods of multiplexing data and sync words for interchannel time displacement correction purposes.

BRIEF DESCRIPTION OF DRAWINGS

The foregoing as well as other objects and advantages of the present invention will become more apparent upon consideration of the following detailed description and claims together with the accompanying drawings of which:

DESCRIPTION OF PREFERRED EMBODIMENTS

Figure 1:
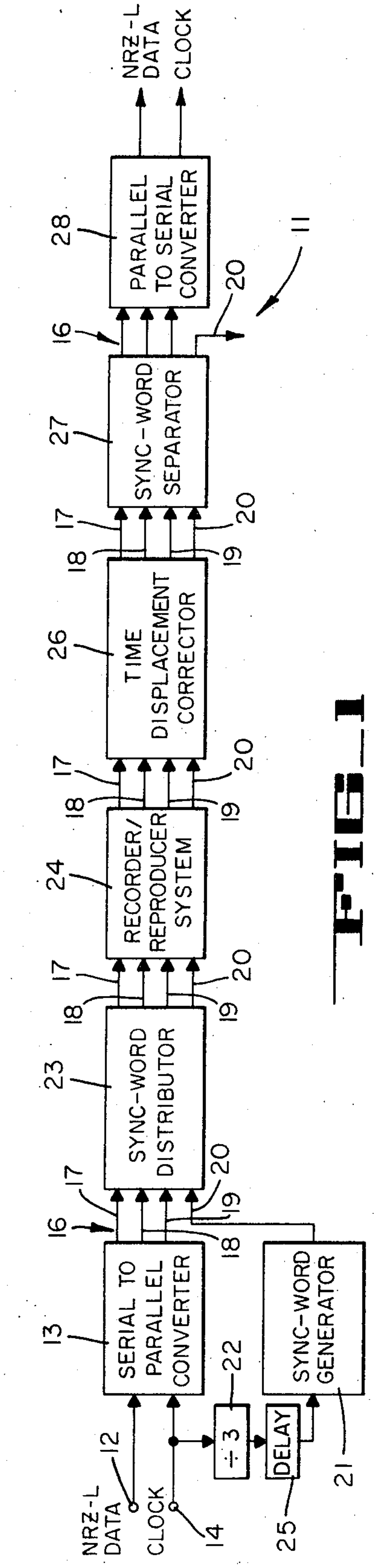
FIG. 1 is a schematic block diagram of a multitrack digital recorder/reproducer system including data and sync word distributor and separator in accordance with the present invention.

FIG. 1 illustrates a multitrack digital recorder/reproducer system 11 in which the technique of the present invention for distributing and separating time related digital data and digital sync words processed through parallel transmission channels is employed to correct interchannel time displacements during the processing of the digital data. In a multitrack digital recorder/reproducer system, particularly, those intended for high-rate data processing, the interchannel time displacement correction is necessary to eliminate relative time displacements between the time related bits in the parallel channels caused by various sources of "skew" errors in the recorder/reproducer system. However, the technique of the present invention for distributing and separating digital data and digital words may be employed in other systems, for example, telemetry transmission systems, required to process time related data simultaneously transmitted through parallel channels under circumstances where relative time displacements between the data transmitted through the different parallel channels may occur.

In multitrack digital recorder/reproducer systems for processing high-rate data, the source of high-rate data usually provides serial bit streams of NRZ-L encoded binary data. The NRZ-L data is coupled to the input terminal 12 of a common serial-to-parallel bit stream convertor 13. A signal representative of data clock also is coupled to the convertor 13 at its clock terminal 14 and serves to clock the serial streams of binary bits into the registers forming the convertor 13 and clock out the binary bits when the registers are full to form parallel bit streams of binary data. The convertor 13 provides the parallel bit streams at a bit rate equal to 1/nth the input serial bit rate, where n equals the number of parallel channels 16 into which the bits of NRZ-L data are distributed. In the illustrated embodiment, the convertor 13 distributes the serial streams of data over three parallel channels 17, 18 and 19. For purposes of interchannel time displacement correction to be described fully hereinbelow, another parallel channel 20 is provided for adding a stream of a repeated unique NRZ-L binary sync word synchronously to the parallel bit streams of data. The unique binary sync word is provided by a sync-word generator 21, which commonly is a binary sequence generator. To guarantee synchronism between the parallel streams of binary bits output by the convertor 13 and the parallel stream of binary bits output by the sync-word generator 21, the data clock at the input terminal 14 is divided by a pulse rate divider 22 and the divided data clock coupled to clock the sync-word generator 21 to issue the bits of the sync word at a rate equal to the bit rate of the parallel bit streams provided by the convertor 13. The equality of data and sync word bit rates in the channels 17–20 requires the pulse rate divider 22 to divide the data clock by $n$, or 3 in the case of the illustrated embodiment. Any time delay introduced in the data channels 16 by the registers forming the convertor 13 may be, if necessary, accounted for in the operation of the sync word generator 21 by providing a delay means 25 between the divider 22 and generator 21.

The particular apparatus embodying the technique of the present invention is a four track digital recorder/reproducer system 11. However, the exact number of parallel tracks of channels 17–20 over which the binary data and sync words are distributed is not of particular significance to the implementation of the technique of the present invention. The number of channels, including $n$ channels 16 for data plus one channel 20 for sync words, is selected so that the bit rate of the binary information in each of the ($n$+1) channels 17–20 is at a level the recorder/reproducer system 11 can reliably handle.

The parallel streams of binary information in the ($n$+1) or four channels 17–20 are coupled to a sync-word distributor 23. As will be described in detail hereinbelow with reference to the two embodiments illustrated in FIGS. 3 and 4, by suitable gating in the distributor 23 the binary data and sync words are distributed so that each of the channels 17–20 at the output of the distributor 23 carries equal amounts of data and sync words. The sync-word distributor 23 is operated to exchange data and sync words so that at least one sync word is sequentially inserted in the ($n$+1) channels 17–20 whereby data and sync words sequentially occur at regular intervals in each of the ($n$+1) channels. In the illustrated embodiments, a unique four-bit format is selected for the sync word. However, the sync word may include different numbers of bits. The only requirement on the selection of the sync word bit pattern is that it be selected in accordance with the NRZ–L encoding scheme so that a pattern is used that does not occur anywhere else in the channels 17–20 of distributed data and sync word except within the sync word locations. Such digital sync word and data encoding techniques are very common in systems for processing digital data in the form of NRZ self-clocking codes. It is the technique of adding at least one or $m$ other channel of sync words to the $n$ channels 16 of data and distributing sync words and data sequentially over the $n$ plus $m$ other channels that obviates the large storage capacities of memories used by and change of data clock rates characteristic of the more customary techniques of distributing data and sync words in each channel and of performing electronic time displacement corrections.

In computer data processing systems, the four channels 17–20 of distributed NRZ–L data and sync words are coupled to a standard multitrack, longitudinal tape recorder/reproducer system 24, usually for data storage purposes. Such systems commonly include record and reproduce electronics for each of the channels 17–20 and associated record and reproduce magnetic heads. The record heads as well as the reproduce heads are usually arranged in separate stacks longitudinally spaced relative to the longitudinal axis of a magnetic tape recording medium, with the gaps of the heads in the respective stacks suitably spaced and aligned transversely of the longitudinal tape axis. A tape transport, including tape drive and guide mechanisms, is provided for moving the tape in direction of its longitudinal axis past the stacks of magnetic heads whereby each channel 17–20 of digital information can be recorded along and reproduced from a separate longitudinal track of the tape. Modern computer tape transports also have systems for controlling the average speed of the transport of the tape.

Upon simultaneous reproduction of the recorded channels of distributed data and sync words, the channels 17–20 of digital information are coupled to a time displacement corrector 26. While such correctors, commonly referred to as either track alignment logic or electronic bit alignment apparatus, are known in the art, a more detailed description of a type of these correctors will be given hereinbelow with reference to FIG. 6 to facilitate understanding the operation of the technique of the present invention in eliminating interchannel time displacement errors. In systems for processing parallel bit streams of high-rate digital information, the parallel channels 17–20 of reproduced digital information usually have various amounts of relative time displacements due to the various sources of static and dynamic skew errors in the recorder/reproducer system 11. The purpose of the time displacement corrector 26 is to eliminate these interchannel time displacements and correlate time between bits recorded along different tracks of the tape. This is accomplished by examining each of the channels 17–20 of reproduced information for the unique bit pattern of the binary sync word and time displacing the binary bits of any three of the channels with respect to another of the channels, for example, channel 17, selected as a reference channel to align the sync words, hence, the bits, in the parallel channels in their original relative time positions prior to recording.

After the interchannel time displacements have been removed from the parallel bit streams of digital information, the channels 17–20 of distributed digital data and sync words are coupled to a sync-word separator 27. The separator 27 employed depends upon the way the $n$ channels 16 of data and the one channel 20 of a repeated sync word were distributed over the ($n$+1) channels 17–20. The details of two embodiments of the separator 27 arranged to operate with the two embodiments of the sync-word distributor 23 illustrated by FIGS. 3 and 4 will be described hereinbelow with reference to FIGS. 7 and 8. However, in accordance with the technique of the present invention, the separator 27 examines each of the channels 17–20 of aligned digital information and exchanges data and sync words included therein whereby the data and sync words are separated and redistributed to their original channels in their original form or pattern. The sync-word separator 27 outputs the parallel bit streams of data on the $n$ or three parallel data channels 16. These parallel data channels 16 extend to a common parallel-to-serial bit stream convertor 28, which functions to restore the serial bit stream as it was at the input terminal 12 of the multitrack digital recorder/reproducer system 11. The sync-word separator 27 may also output the bit stream of a repeated sync word on the channel 20.

Figure 2:
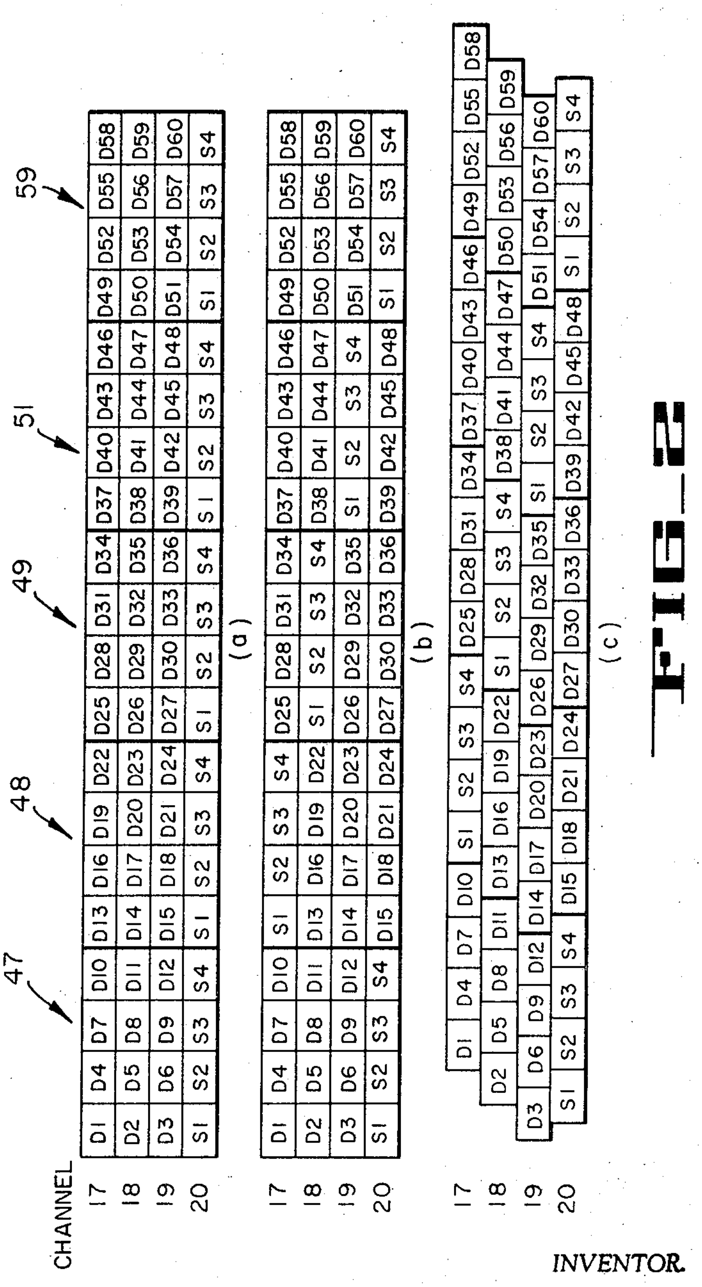
FIG. 2 is a timing diagram illustrating the effects of interchannel time displacements on the bit alignment of associated digital data carried in parallel channels with line (a) showing the bit alignment of the digital data in three parallel data channels and digital sync word in one additional parallel sync channel prior to recording, line (b) showing one type of distribution in accordance with the present invention of the digital data and digital sync word in the four parallel channels prior to recording, and line (c) showing the various amounts of relative time displacements of the reproduced four parallel channels of digital data and digital sync words distributed as shown in line (b).
Figure 3:
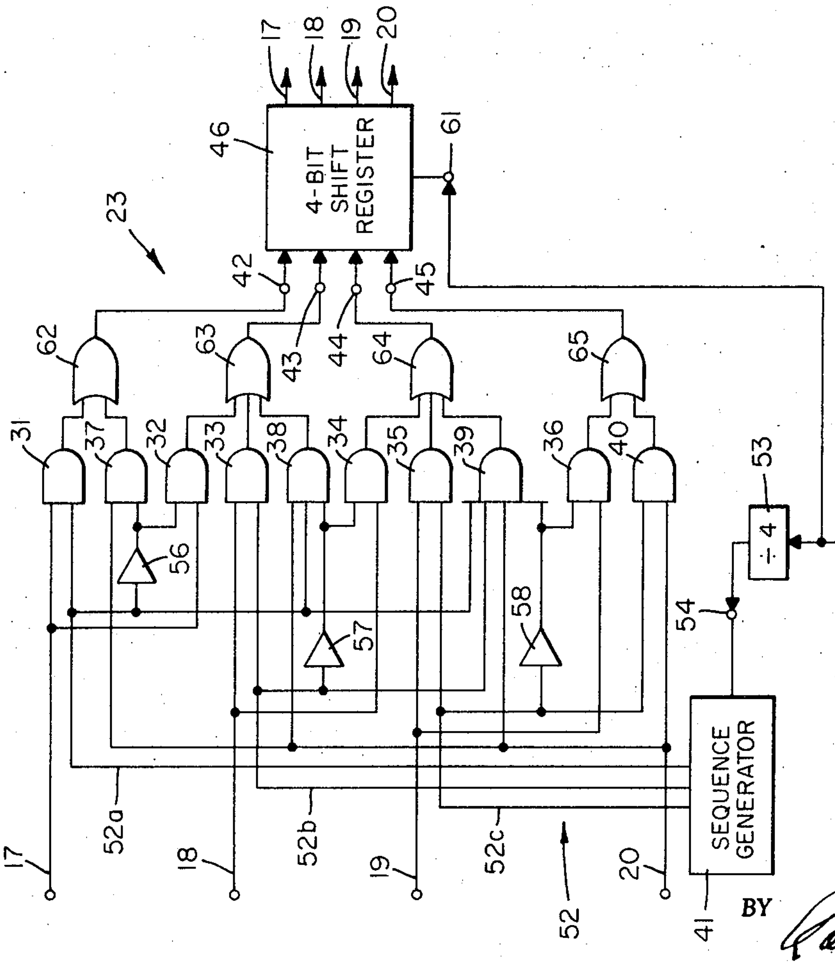
FIG. 3 is a schematic logic diagram of one embodiment of apparatus for distributing data and sync words in the pattern shown in FIG. 2.

Referring to FIGS. 2 and 3, an embodiment of the sync-word distributor 23 will be described that includes logical circuits for distributing a four-bit sync word in each of the parallel bit streams of data by inserting the sync word in a data channel 16 and shifting the corresponding number of data bits to adjacent data or sync channels 16 and 20. Line (a) in the timing diagram of FIG. 2 shows the distribution and bit time alignment of the data bits D and sync bits S in the channels 17–20. Each block represents one bit period. Line (b) in the timing diagram of FIG. 2 shows the manner in which the sync-word distributor 23 embodiment of FIG. 3 inserts the sync word repeated in channel 20 sequentially in the channels 17-20. To effect the illustrated distribution of the data bits D and sync bits S, the distributor 23 includes a series of transmission gates 31–40 coupled to the channels 17–20. In cooperation with a sequence generator 41, these gates distribute the data bits D and sync bits S to the four inputs 42–45 of a four-bit parallel shift register 46. The register 46 forms the bit streams in the four parallel channels 17–20 extending from its outputs.

More specifically, each of the channels 17–19 carrying data is coupled to the signal inputs of one of the pairs of transmission gates 31 and 32, 33 and 34, and 35 and 36. One transmission gate of each pair (i.e., 31, 33 and 35) serves to couple the data received on a channel to the same channel at the output of the distributor 23 and the other transmission gate of each pair (i.e., 32, 34 and 36) serves to couple the data received on the channel to an adjacent channel. Each of the remaining four transmission gates 37–40 is coupled to receive at its signal input the stream of sync word bits in the channel 20. These remaining transmission gates are operated to distribute the sync word sequentially to the channels 17–20 at the output of the distributor 23. The gate inputs of the transmission gates are provided gate signals so that when a sync word is to remain in the channel 20, data from the channels 17–19 are transmitted to the same channels at the output of the distributor 23 (see the first sync word period 47 in line (b) of FIG. 2). However, if a sync word is inserted in the channel 17 carrying data bits (see the second sync word period 48 in line (b) of FIG. 2), data from channels 17–19 are distributed respectively to channels 18–20. When a sync word is inserted in the channel 18 carrying data bits (see the third sync word period 49 in line (b) of FIG. 2), data from channels 18 and 19 are distributed respectively to channels 19 and 20. However, data in channel 17 remains in that channel. To insert a sync word in channel 19 (see the fourth sync word period 51 in line (b) of FIG. 2), data from channel 19 is exchanged with the sync word in channel 20 while data in channels 17 and 18 are transmitted to the same channels at the output of the distributor 23.

The transmission gates 31–40 are controlled by a three-bit binary gate word provided by the sequence generator 41. The generator 41 provides a sequence of four three-bit binary gate words on lines 52. Each gate word of the sequence of four lasts a sync word period, i.e., four parallel stream bit periods or 12 data clock periods. The sequence of four gate words is clocked onto lines 52 at one fourth the bit rate of the parallel bit streams by a clock signal obtained by dividing the pulse rate of the delayed divided data clock provided by the delay means 25 from the pulse rate divider 22 (see FIG. 1). The division is performed by a divide-by-four pulse rate divider 53 and its clock signal output is coupled to the clock input terminal 54 of the sequence generator 41. The first data clock pulse received at the clock terminal 14 of the system 11 sets the sequence generator 41 to issue a three-bit binary gate word 111. Since each of the lines 52 carries a logical "1" state signal, the transmission gates 31, 33, 35 and 40 are enabled to transmit the digital information received at their signal inputs. The transmission gate 40 is enabled by the logical "1" state signal on line **52*c*. This line 52*c* receives a logical "1" state signal only when a logical "1" state signal is present on all three of the lines 52. Since a gate input of each of the other transmission gates 32, 34 and 36–39 is coupled to one of the lines 52 through one of the inverters 56–58, these gates are disabled. With the transmission gates in these states, sync bits are inserted in channel 20 and data bits from each of the channels 17–19 at the input of the distributor 23 are transmitted to the same channels at the output of the distributor 23 as shown by the first sync word period 47 in line (b) of FIG. 2. Since the statuses of the lines 52 remain unchanged for four parallel stream bit periods, the bits of an entire sync word are inserted in the channel 20**.

The next three clock signals received by the sequence generator 41 from the divider 53 sequentially step the generator 41 to issue successively the three-bit binary gate words 000, 001 and 011. Thus, it is seen that the sequence of four gate words issued by the sequence generator 41 is, conveniently, a finite series of binary numbers.

When the sequence generator 41 is set to issue the second of the sequence of three-bit binary gate words or 000, each of the lines 52 carries a logical "0" state signal. These signals disable all of the transmission gates 31, 33, 35 and 40 that transmit the digital information from the channels 17–20 at the input of the distributor 23 to the same channels at the output of the distributor 23. However, the transmission gates 32, 34 and 36 that serve to couple data between adjacent channels are enabled because the inverters 56–58 provide enabling logical "1" state signals on at their gate inputs from the logical "0" state signals on lines 52. Of the transmission gates 37-39 serving to insert sync words in the data streams or channels 17–19, only gate 37 is enabled. Transmission gates 38 and 39 are disabled by virtue of receiving at least one disabling logical "0" state signal at a gate input, gate 38 receiving the disabling signal from the line **52*a* and gate 39 receiving two disabling signals from the lines 52*a* and 52*b*. With the transmission gates in these states, the sync word is inserted via gate 37 in the channel 17 and the data in the channels 17–19 at the input of the distributor 23 are coupled to the adjacent channels 18–20 at the output of the distributor 23. This distribution of data and sync bits lasts for four parallel stream bit periods as shown by the second sync word period 48 in line (b) of FIG. 2**.

Upon receipt of the third clock signal from the divider 53, the sequence generator 41 is set to issue the third of the sequence of three-bit binary gate words or 001. This places a logical "1" state signal on line **52*a* and logical "0" state signals on lines 52*b* and 52*c*. The logical "1" state signal on line 52*a* enables transmission gate 31 and, through the operation of the inverter 56, disables transmission gates 32 and 37. Thus, data bits received from channel 17 at the input of the distributor 23 are transmitted to the same channel at the output of the distributor 23. However, the other transmission gates 33, 35 and 40 that transmit the digital information from the channels 18–20 at the input of the distributor 23 to the same channels at the output of the distributor 23 are disabled by the presence of the logical "0" state signals on lines 52*b* and 52*c*. Of the transmission gates 32, 34 and 36 that couple data between adjacent channels, gate 32 is disabled by the logical "0" state signal coupled to its gate input by the inverter 56 that receives the logical "1" state signal from line 52*a*. Since the other lines 52*b* and 52*c* carry logical "0" state signals, the inverters 57 and 58 provide enabling logical "1" state signals to the gate inputs of the transmission gates 34 and 36. Therefore, these gates 34 and 36 are enabled and the data in the channels 18 and 19** at the input of the distributor 23 are coupled to the adjacent channels 19 and 20 at the output of the distributor 23. Only transmission gate 38 of the gates 37–39 serving to insert sync words in the data streams, or channels 17–19, is enabled. Both of its gate inputs receive an enabling logical "1" state signal, one from line 52*a* and the other from the line 52*b* via the inverter 57. Transmission gate 37 is disabled by the operation of the inverter 56 and transmission gate 39 is disabled by the logical "0" state signal coupled to its gate input from line 52*b*. With the transmission gates in these states, the sync word is inserted via gate 38 in the channel 18, the data in channel 17 remains in that channel and the data in channels 18 and 19 at the input of the distributor 23 are coupled to the adjacent channels 19 and 20 at the output of the distributor 23. This distribution of data and sync bits also last for four parallel stream bit periods as shown by the third sync word period 49 in line (b) of FIG. 2.

The fourth clock signal from the divider 53 sets the sequence generator 41 to issue the last or fourth three-bit binary gate word of the sequence of four, or 011. This places logical "1" state signals on lines 52*a* and 52*b* and a logical "0" state signal on line 52*c*. Examination of the logical circuits of the distributor 23 reveals they respond to this binary gate word by inserting the sync word in channel 19, transmitting the data received from channels 17 and 18 at the input of the distributor 23 to the same channels at the output of the distributor 23 and coupling the data in channel 19 at the input of the distributor 23 to the adjacent channel 20 at the output of the distributor. The data in channels 17–18 at the input of the distributor 23 remain in those channels because the logical "1" state signals on lines 52*a* and 52*b* enable transmission gates 31 and 33 while disabling transmission gates 32, 37 and 38. The sync word is inserted in channel 19 because the transmission gate 35 is disabled by the logical "0" state signal on line 52*c* and the transmission gate 34 is disabled by the operation of the inverter 57 while the transmission gate 39 is enabled by the proper combination of gate signals (i.e., logical "1" state signals received from lines 52*a* and 52*b* and a logical "1" state signal obtained by inverting the logical "0" state signal on line 52*c*). The data in channel 19 is coupled to the adjacent channel 20 because the logical "0" state signal on line 52*c* enables the transmission gate 36 through the operation of the inverter 58 while disabling the transmission gate 40. The fourth sync word period 51 in line (b) of FIG. 2 shows this distribution of data and sync bits, which also lasts for four parallel stream bit periods.

The next clock signal received by the sequence generator 41 at its clock input terminal 54 causes the sequence of four outputs provided on lines 52, hence, the sequence of the distribution of the sync word in the channels 17–20, to begin again (see sync word period 59 in line (b) of FIG. 2).

The data and sync bits are transferred to the channels 17–20 by parallel loading the four-bit shift register 46 with the bits transferred by the transmission gates 31–40 and clocking the loaded bits onto the channels at a rate equal to the parallel stream bit rate. The divided data clock provided by the pulse rate divider 22 is coupled to the clock terminal 61 to clock the register 46. To load the register 46, OR gates 62–65 are provided having their outputs coupled respectively to the four parallel inputs 42–45 of the register 46. The OR gate 62 receives the outputs of the transmission gates 31 and 37 and, depending on the three-bit binary gate word issued by the sequence generator 41, couples either data bits from channel 17 or sync bits from channel 20 to the input 42 of the register 46. The OR gate 63 receives the outputs of the transmission gates 32, 33 and 38 and, depending on the gate word issued by the sequence generator 41, couples either data bits from channels 17 or 18 or sync bits from channel 20 to the input 43 of the register 46. Similarly, the OR gate 64 couples either data bits from channels 18 or 19 via transmission gates 34 and 35 or sync bits from channel 20 via transmission gate 39 to the input 44 of the register 46. The OR gate 65 couples either data bits from channel 19 via transmission gate 36 or sync bits from channel 20 via transmission gate 40 to the input 45 of the register 46.

Each time the register 46 receives a divided data clock pulse at its clock terminal 61, the bits stored in the register 46 are parallelly shifted onto the channels 17–20 and new bit information in the form of the output states of the OR gates 62–65 loaded into the register 46. Since the divided data clock rate is four times the clock signal that sequences the output of the sequence generator 41, four parallel groups of four bits each are shifted onto the channels 17–20 before a change in the distribution of the data and sync bits occurs.

While a particular distribution sequence of data and sync bits has been described with reference to FIGS. 2 and 3, it is only illustrative of the operation of that embodiment of the sync-word distributor 23. If a different sequence of distribution is selected, it is only necessary to change the logic arrangement of the sync-word separator 27 and possibly, the time displacement corrector 26. Also, if a different number, *n*, of data channels 16 are included in the multitrack digital recorder/reproducer system 11, the sequence generator 41, and logical circuits and the register 46 would be modified to perform the concomitant different sync word distribution sequence. Of course, this latter modification of the sync-word distributor 23 would also require corresponding modifications of the time displacement corrector 26 and sync-word separator 27.

Figure 4:
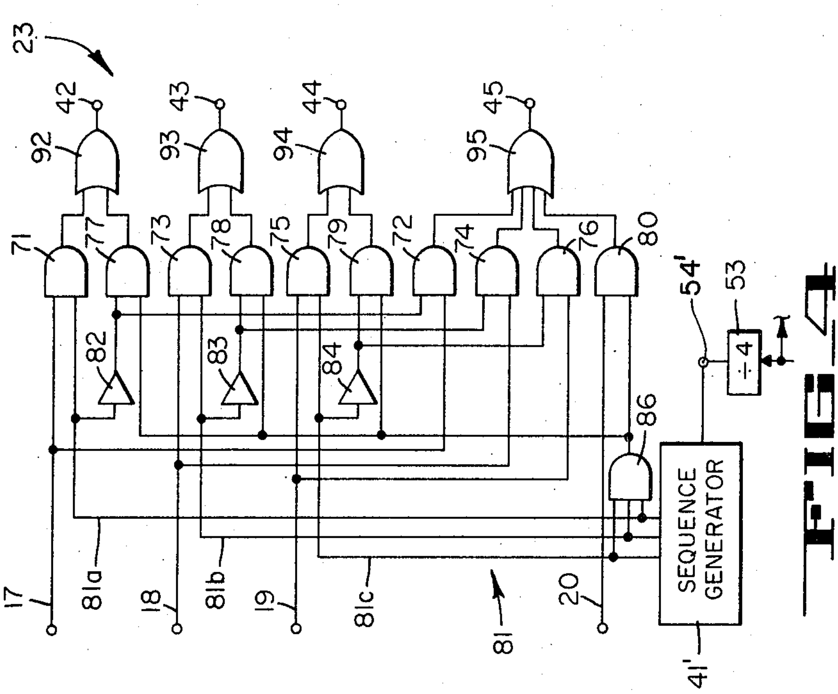
FIG. 4 is a schematic logic diagram of one embodiment of apparatus for distributing data and sync words in the pattern shown in FIG. 5.
Figure 5:
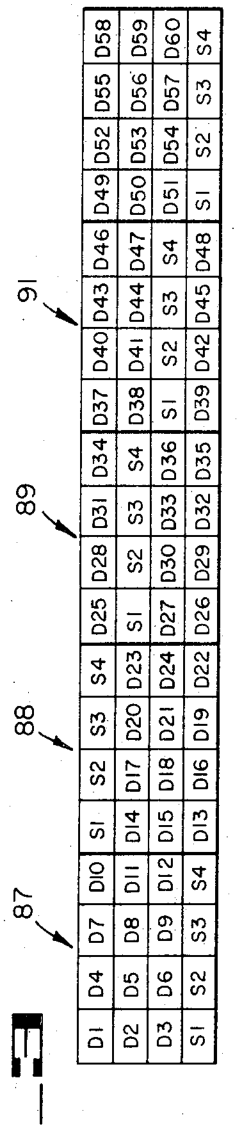
FIG. 5 is a diagram illustrating another distribution in accordance with the present invention of the digital data and digital sync word in the four parallel channels prior to recording.

Another embodiment of the sync-word distributor 23 is shown in FIG. 4. This embodiment includes logical circuits for distributing a four-bit sync word in each of the parallel bit streams of data by exchanging the sync word and the corresponding number of data bits of the data stream to which the sync word is added so that the sync word is sequentially inserted in each of the bit streams from the data and sync channels 16 and 20 and bits from each of the data and sync channels 16 and 20 are sequentially inserted in channel 20. FIG. 5 illustrates this distribution of data bits, D, and sync bits, S.

This embodiment of the sync-word distributor 23 differs from that of the embodiment of FIG. 3 only in the arrangement of the logical circuits and the binary gate word sequence issued by the sequence generator 41′. In this embodiment, each of the channels 17–19 carrying data is coupled to the signal inputs of one of the pairs of transmission gates 71 and 72, 73 and 74, and 75 and 76. One transmission gate of each pair (i.e., 71, 73 and 75) serves to couple the data received on a channel to the same channel at the output of the distributor 23 and the other transmission gate of each pair (i.e., 72, 74, and 76) serves to couple the data received on the channel to the channel 20 at the output of the distributor 23. Four additional transmission gates 77–80 are provided and have their signal inputs coupled to receive the stream of sync word bits in channel 20 at the input of the distributor 23. Each of the pairs of transmission gates 71 and 72, 73 and 74, and 75 and 76 together with one of the transmission gates 77–79 have their gate inputs coupled to one of the lines 81 so that each pair and its associated transmission gate 77, 78 or 79 is controlled by the same gate signal provided by the sequence generator 41'. The gate inputs of the transmission gates 72, 74 and 76–79 are coupled through inverters 82–84 so that they are always in states opposite their associated gates 71, 73 and 75. The transmission gates 71–80 are operated so that data received on each of the channels 17–19 at the input of the distributor 23 either is coupled by one of the gates 71, 73 or 75 to the same channels at the output of the distributor 23, or when a sync word is inserted in the channel by one of the gates 77–79, is coupled by one of the gates 72, 74 or 76 to channel 20 at the output of the distributor 23. When a sync word is not inserted in one of the data bit streams, the sync word remains in channel 20 by the cooperation of the AND gate 86 and the transmission gate 80. Therefore, this embodiment of the sync word distributor 23 results in a distribution pattern of data bits, D, and sync bits, S, in the channels 17–20 that includes, at the output of the distributor 23, in each of the channels 17–19 a sequence including data bits from the same channel at the input of the distributor and sync words from channel 20, and in the channel 20 a sequence including data bits from each of the channels 17–19 and sync words from channel 20. This distribution pattern is shown in FIG. 5.

The transmission gates 71–80 are controlled by a three-bit binary gate word provided by the binary sequence generator 41'. This sequence generator 41' provides a sequence of four three-bit binary gate words on line 81. The gate word sequence is clocked onto lines 81 at one fourth the parallel stream bit rate by the clock signal provided to the clock input terminal 54' of the generator 41' by the pulse rate divider 53. Therefore, each gate word of the sequence lasts a sync word period.

Transmission gates 71, 73 and 75 are enabled by logical "1" state signals on associated lines 81*a*, 81*b* and 81*c*. The transmission gate 80 is enabled by the operation of AND gate 86 whenever all of the lines 81 receive a logical "1" state signal from the sequence generator 41'. Each of the remaining transmission gates 72, 74 and 76–79 are enabled whenever a logical "0" state signal is present on the line 81 to which its gate input is coupled by one of the inverters 82–84. To distribute the data bits, D, and sync bits, S, in the pattern shown in FIG. 5, the sequence generator 41' is arranged to issue a three-bit binary gate word 111 in response to the first data clock pulse received at the clock terminal 14 of the system 11. This gate word enables the transmission gates 71, 73, 75 and 80 while disabling the other gates for four parallel stream bit periods. With the transmission gates in these states, the digital information from channels 17–20 at the input of the distributor 23 is transmitted to the same channels at the output of the distributor 23. The first sync word period 87 of FIG. 5 shows this distribution of data bits, D, and sync bits, S.

The next three successive clock signals received by the sequence generator 41' sequentially step the generator to issue successively a logical "0" state signal on each of the lines 81*a*, 81*b* and 81*c*. When a logical "0" state signal is on line 81*a*, transmission gates 71 and 80 are disabled and transmission gates 72 and 77 are enabled. The other gates are placed in the states they are in when the three-bit binary gate word 111 is issued. Thus, the bits of a sync word are inserted in channel 17 and the corresponding number of data bits are inserted in channel 20 at the output of the distributor 23. Data from channels 18 and 19 remain in those channels for this sync word interval. This distribution is shown by the second sync word period 88 of FIG. 5.

When a logical "0" state signal is on line 81*b*, transmission gates 73 and 80 are disabled and transmission gates 74 and 78 are enabled. The other gates are placed in the states they are in when the three-bit binary gate word 111 is issued. With the transmission gates in these states, the bits of a sync word are inserted in channel 18 and the corresponding number of data bits are inserted in channel 20 at the output of the distributor 23. Data from channels 17 and 19 remain in those channels for this sync word interval. The third sync word period 89 of FIG. 5 shows this distribution.

A logical "0" state signal on line 81*c* disables transmission gates 75 and 80 and enables transmission gates 76 and 79. Since the other lines 81*a* and 81*b* have logical "1" state signals thereon, the other transmission gates are placed in the states they are in when the three-bit binary gate word 111 is issued. Thus, the bits of a sync word are inserted in channel 19 and the corresponding number of data bits are inserted in channel 20 at the output of the distributor 23. Data from channels 17 and 18 remain in those channels for this sync word interval. This distribution is shown in the fourth sync word period 91 of FIG. 5.

As additional clock signals are received by the sequence generator 41', the generator repeats the sequence of four three-bit binary gate words whereby the sequence of the distribution of the sync words in the channels 17–20 is repeated.

To couple the distributed data and sync bits to the register inputs 42–45, OR gates 92–95 are provided. Each of the OR gates 92–95 is associated with one of the channels 17–20 to receive the outputs provided by the associated AND gates 71–80 and transfer them to the register inputs 42–45. The four-bit shift register 46 operates in the manner described with reference to the sync-word distributor 23 embodiment of FIG. 3 to transfer the data and sync bits to the channels 17–20 at its output.

Figure 6:
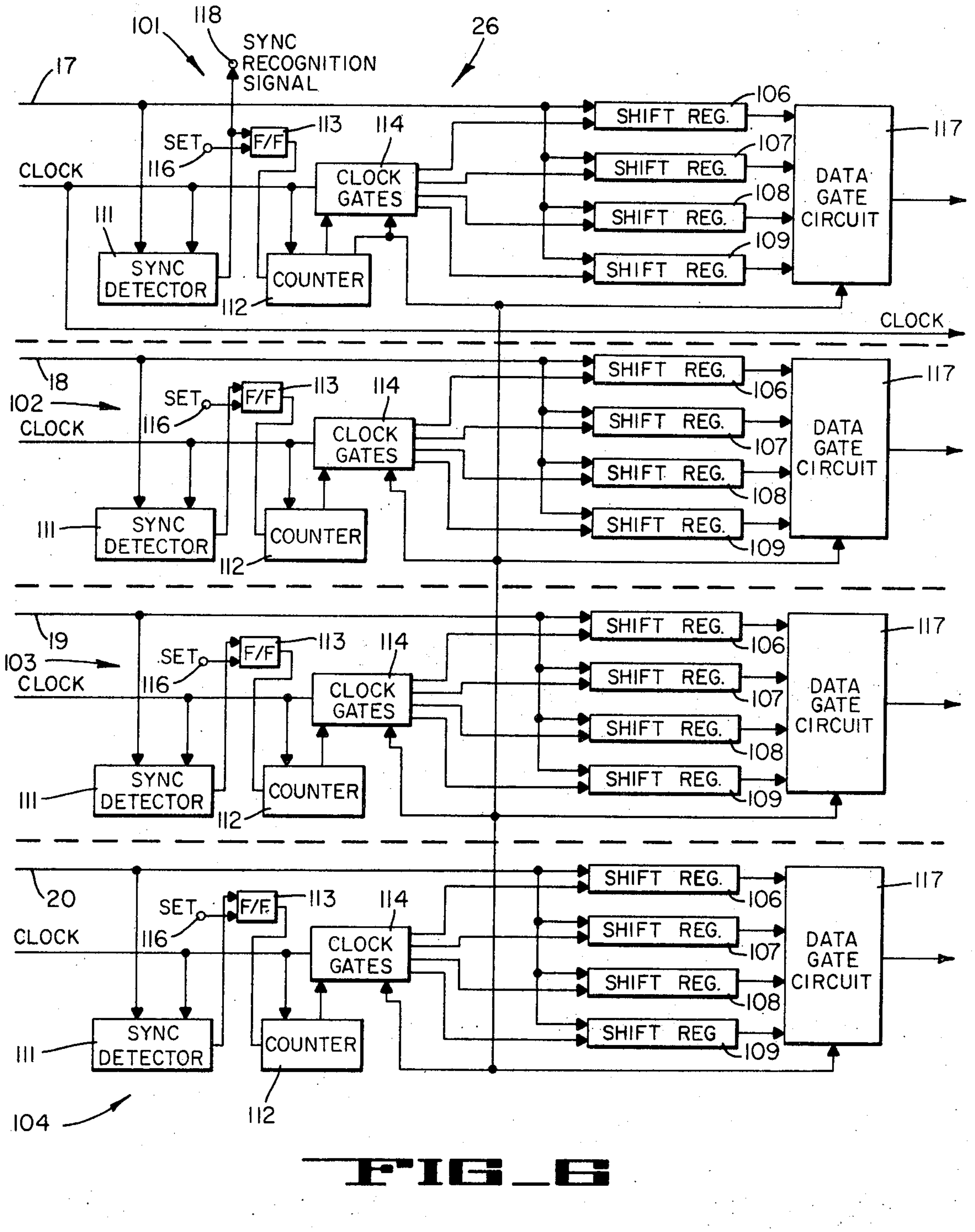
FIG. 6 is a schematic block diagram of electronic bit alignment apparatus commonly employed in digital recorder/reproducer apparatus.

Line (c) of FIG. 2 illustrates an example of the relative time displacements that may be introduced in the parallel bit streams by skew errors in the multitrack digital recorder/reproducer system 11. To recover the data, these time displacement errors must be eliminated. The time displacement corrector 26 of FIG. 6 is an example of a common register file memory corrector with simultaneous write/read capability that may be used to eliminate such errors from parallel bit streams having sync words distributed in the streams by the sync word distributors of FIGS. 3 and 4. The time displacement corrector 26 must be designed for the worst-case condition of time displacement error, or the maximum possible displacement between two parallel bit streams. Furthermore, since the maximum timing differences cannot be predicted precisely, a generous margin of storage should be provided in the register file memory corrector 26. The embodiment of FIG. 6 is designed for worst-case condition of ±4 parallel stream bit periods.

As shown in FIG. 6, the time displacement corrector 26 includes four data processing channels 101–104, each arranged to receive and process digital information from one of the channels 17–20. Each of the data processing channels 101–104 includes four shift registers 106–109, each having a storage capacity of eight bits. A sync word recognizer 111 also is included in each of the data processing channels 101–104 for detecting the presence of the unique pattern of bits forming the sync word. Such recognizers are common and usually include a register coupled to receive the bits of the stream and a clock signal extracted from the streams of digital information at the stream bit rate. The bits of the stream are clocked into the register and are accumulated as long as the pattern is consistent with that of the sync word. The register resets itself whenever the accumulated pattern becomes inconsistent. A sync recognition signal is issued if the register accumulates a sequence of bits arranged in the sync word pattern.

One of the bit streams, for example, in channel 17, is used as a reference stream with respect to which the bits of the other streams are aligned. The first time and every other time thereafter a sync word is recognized in the bit stream of channel 17, a 32-step binary counter 112 is reset to a reset address number 00000 by the sync recognition signal issued by the sync word recognizer or detector 111. The counter 112 is provided with suitable blocking logic in the form of a bistable flip-flop 113 to be responsive to only every other sync word recognition signal issued after the first one for resetting the counts 112. Successive sync word recognition signals cause the flip-flop 113 to alternate states. The output of one stage of the flip-flop 113 is coupled to reset the counter 112 so that each time the flip-flop 113 is set in the first state the counter 112 is reset. Prior to reproduction of the recorded digital information, the operator causes a command to be issued to the set input terminal 116 of flip-flop 113 to place the flip-flop 113 in its second state, thereby, readying it to be placed in its first state upon receipt of the first sync word recognition signal.

The counter 112 also receives the parallel stream bit rate clock and, after being reset, begins through a set of clock gates 114 to clock into the shift register 106 the first eight digital bits immediately following the sync word detected in channel 17. These first eight bits are according to line (c) of FIG. 2, D25, 28, 31, 34, 37, 40, 43 and 46. Then, the counter 112 automatically sets the plurality of clock gates 114 to switch the next eight bits of stream in channel 17 to shift register 107, then to shift register 108, 109 and back to 106, where the counter waits to be reset by the third sync word in channel 17. The second sync word received from channel 17 is stored in the last four bit positions of the register 107 since the flip-flop 113 prevents the resetting of the counter 112. Thus, two sequences of distributed data and sync bits of the stream in channel 17 are stored in the registers 106–109 of the data processing channel 101.

When a first and, thereafter, every other sync word is identified in the bit stream received from channel 18 by the associated sync detector 111, the counter 112 associated with the processing channel 102 is reset to a reset address number 00100. The instant of this event with respect to the events in the bit stream received from channel 17 depends on the time displacement error between these two streams. If there is no error, bit D38, the first bit after the sync word, in channel 18, is clocked into the fifth bit position of the register 106 of the data processing channel 102 at the same instant bit D37 enters the corresponding bit position of the register 106 of the data processing channel 101. If a time displacement error does exist, for example, as illustrated by line (c) of FIG. 2, these bits still are entered into those register positions, although at different relative times according to the time displacement error. The bits are always entered in those register positions because the sync word in the bit stream received from channel 18 is four parallel stream bit positions later than the sync word in the bit stream received from channel 17. Only four data bits D38, 41, 44 and 47 are entered into register 106 of the processing channel 102 before the associated counter 112 sets the plurality of clock gates 114 to switch the next eight bits of the stream to the shift register 107 of the processing channel 102. After initial lockup, which will be described in greater detail hereinbelow the four bits of a second previous sync word will be found in register 106 of the processing channel 102 ahead of bit D38.

The events in the data processing channels 103 and 104 are identical to those in processing channels 101 and 102 except in processing channel 103 the reset address must be eight bits later than that of processing channel 101 and in processing channel 104 12 bits later. Hence, the counter 112 in processing channel 103 is reset to 01000 every other time a sync word is detected in channel 19 and the first eight parallel stream bits immediately following the detected sync word are clocked into register 107 of processing channel 103. Also, the counter 112 of processing channel 104 is reset to 01100 every other time a sync word is detected in channel 20 and four of the first eight parallel stream bits immediately following the detected sync word are clocked into the last four bit positions of register 107 of the processing channel 104 and the last four of the eight bits into the first four bit positions of register 108.

As is common practice, initial lock-up is achieved by recording along each track at the beginning of the tape a unique series of bits which, upon reproduction, are employed to set the various circuits of the record/reproduce system 11 for processing the information. In the illustrated embodiments of the present invention, eight consecutive periods of a four bit alignment word are input at the terminal 12 of the record/reproduce system 11 preceding the data. The sync word distributor 23 operates on the eight consecutive periods of the alignment word so that each of the channels 17–20 is preceded by eight consecutive periods of distributed alignment and sync words. Upon reproduction, the eight consecutive periods of distributed alignment and sync words are clocked into the registers 106–109 of each of data processing channels 101–104 in the manner described hereinabove. Hence, upon receipt of the bits, for example, in sync word period 47, all of the registers 106–109 will contain bits, unless time displacement errors exist.

At the moment the register 108 of data processing channel 101 begins to receive bits of the second sequence of distributed data or alignment and sync bits, gate signals are issued by the counter 112 in the data processing channel 101 and are coupled to data gate circuit 117 connected to the output of the registers 106–109 in all of the processing channels 101–104. The gate signals are obtained from the outputs of the binaries of the binary chain forming the counter 112 so that the gate circuit 117 couples the registers 106–109 to the channels 17–20 according to particular stored binary numbers relative to the reset address number. The data gate circuit 117 in each of the processing channels 101–104 includes gates coupled to the output of each of the registers 106–109 that operate in response to the gate signals to pass to the associated on the channels 17–20 and sync-word separator 27 the bits stored in the registers. The first gate signal issued by the counter 112 in the data processing channel 101 enables the gates connected to the registers 106 in each of processing channels 101– 104 to pass to the channels 17–20 the bits clocked out of the registers by the parallel stream bit rate clock. The gates of the data gate circuits 117 associated with the other registers 107–109 are sequentially opened to pass the bits coming from those registers at intervals of eight parallel stream bit periods. Since the bits received by the time displacement corrector 26 from each of the channels 17–20 in a certain time position relative to the sync words in the channel are always entered into the same bit position of the registers 106–109, which positions correspond to the desired interchannel bit alignment positions, the bits clocked out of the registers 106–109 to the sync-word separator 27 are time correlated whereby all interchannel time displacement errors are eliminated.

Figures 7, 8:
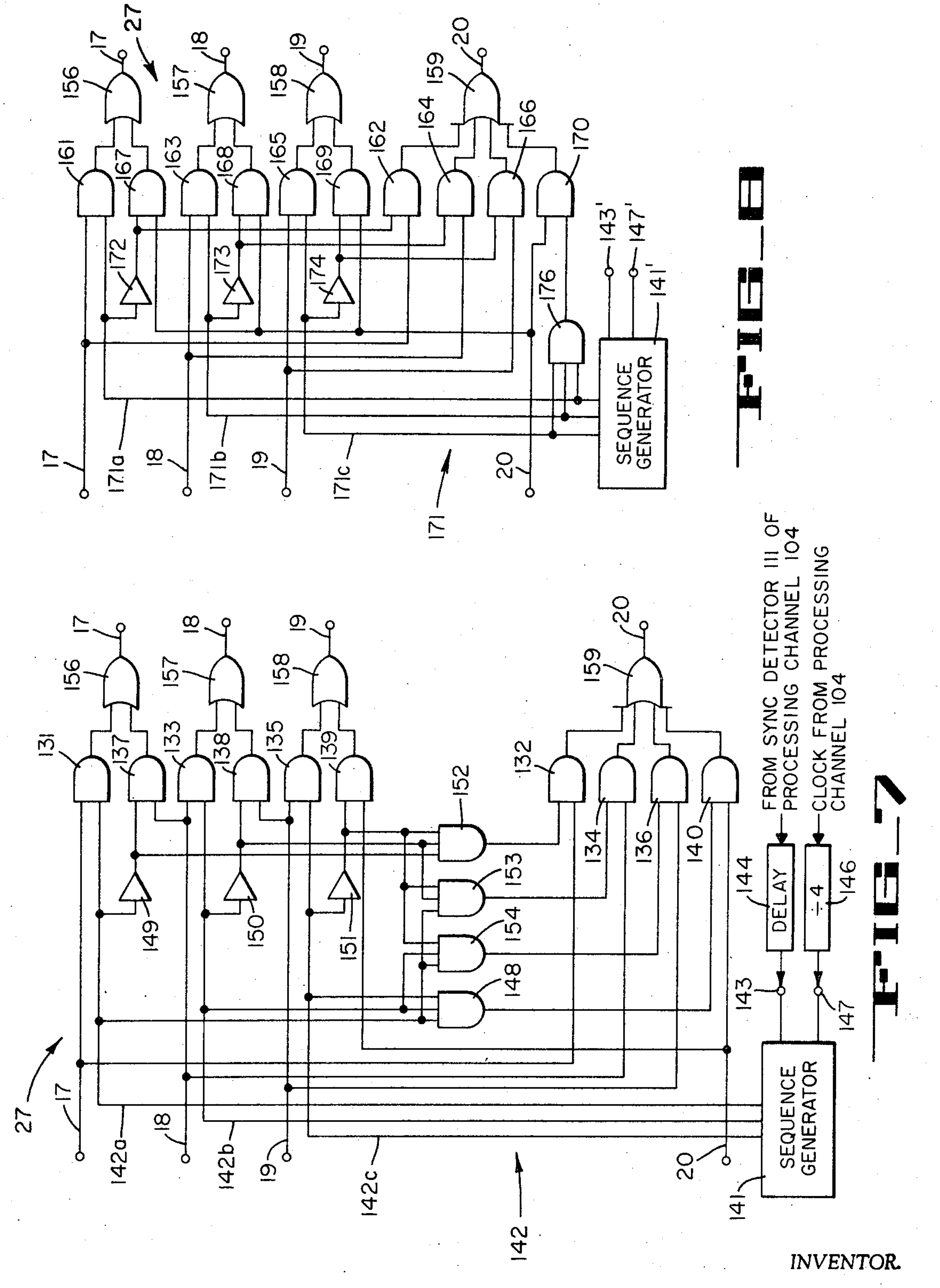
FIG. 7 is a schematic logic diagram of one embodiment of apparatus for separating reproduced data and sync words distributed in the pattern shown in FIG. 2.
FIG. 8 is a schematic logic diagram of one embodiment of apparatus for separating reproduced data and sync words distributed in the pattern shown in FIG. 5.

To restore the serial bit stream as it was at the input of the system 11, the sync words must be removed from the three channels 17–19 and the data bits in the channel 20 reinserted at their original bit locations in the bit streams of channels 17–19. FIGS. 7 and 8 illustrate two embodiments of the sync-word separator 27 for accomplishing the separation and redistributionof the data and sync bits. The embodiment of FIG. 7 is employed to separate the data and sync bits distributed in the channels 17–20 in accordance with line (b) of FIG. 2 by the sync-word distributor 23 embodiment of FIG. 3. The embodiment of FIG. 8 is employed to separate the data and sync bits distributed in the channels 17–20 in accordance with FIG. 5 by the sync-word distributor 23 embodiment of FIG. 4.

Considering the sync-word separator 27 embodiment of FIG. 7, transmission gates 131–140 are coupled to the channels 17–20 and, in cooperation with a sequence generator 141 and logical control circuits, operate to redistribute the data and sync bits to their original channels 17–19 and 20, respectively. The sync word distributor 23 embodiment of FIG. 4 operates to distribute data and sync bits in the channels 17–20 by sequentially inserting sync words in the channels and, when the sync word is inserted in one of the data channels 16, transferring a corresponding number of data bits to immediately adjacent channels. Therefore, each of the channels 17–19 carrying distributed data and sync bits is coupled to the signal inputs of one of the pairs of transmission gates 131 and 132, 133 and 134, and 135 and 136. One transmission gate of each pair (i.e., 131, 133 and 135) serves to couple the data bits received on a channel to the same channel at the output of the separator 27. The other transmission gate of each pair (i.e., 132, 134 and 136) couples the sync bits received on a channel to the channel 20 at the output of the separator 27. The transmission gate 140 is operated to couple the sync bits received on channel 20 to the same channel at the output of the separator 27. The remaining transmission gates 137–139 are operated to couple the data bits received on channels 18–20 to their original adjacent channels 17–19 at the output of the separator 27.

Gate inputs of the transmission gates 131–140 are provided with and controlled by the gate word bits generated by the sequence generator 141 and associated logical control circuits so that when the sync word appears in channel 20 at the input of the separator 27, the bits in the channels 17–20 at the input of the separator 27 are coupled to the same channels at the output. However, when the sync word appears in channel 17 at the input of the separator 27, the transmission gates 131–140 are controlled to couple the sync word bits to channel 20 and the data bits in channels 18–20 at the input to the adjacent channels 17–19, respectively, at the output of the separator 27. When the sync word appears in channel 18 at the input of the separator 27, the transmission gates 131–140 are controlled to couple the sync word bits to channel 20 at the output of the separator 27, the data bits in channel 17 at the input of the separator 27 to the same channel at the output of the separator 27, and the data bits in channels 19 and 20 at the input to the adjacent channels 18 and 19, respectively, at the output of the separator 27. When the sync word appears in channel 19 at the input of the separator 27, the transmission gates 131–140 are operated to exchange the sync bits in channel 19 with the data bits in channel 20 so that they appear respectively in channels 20 and 19 at the output of the separator 27. The data bits in the other channels 17 and 18 at the input of the separator 27 are coupled to the same channels at the output.

The transmission gates 131–140 are controlled by a three-bit binary gate word provided by the sequence generator 141. The generator 141 provides a sequence of four three-bit binary gate words on lines 142. Like the sequence generators of the sync-word distributor 23 embodiments of FIGS. 3 and 4, each binary gate word of the sequence provided by the sequence generator 141 lasts a sync word period or four parallel stream bit periods. The sequence of four gate words is initiated by a sync recognition signal obtained from the sync detector 111 of the data processing channel 101 at output terminal 118 and coupled to the set input terminal 143 of the sequence generator 141. Since the sync recognition signal is issued by sync detector 111 at the end of the sync word period and the bits are clocked out of the shift registers 106–109 of the time displacement corrector 26 eight parallel stream bit intervals following the occurrence of the sync recognition signal, the sync recognition signal is advantageously delayed an interval equal to eight parallel stream bit intervals prior to coupling it to the set input terminal 143 of the generator 141 to initiate the sequence of four three-bit binary gate words. The delay is provided by a suitable delay means 144 and serves to start the three-bit binary gate word sequence when the sync word appears in channel 20 at the input of the separator 27.

To step the sequence generator 141 through the sequence of four three-bit binary gate words at the desired rate of one fourth the parallel stream bit rate, the parallel stream clock from the data processing channel 101 is coupled to a pulse rate divider 146. The pulse rate divider 146 divides the clock rate by four and issues a clock signal at the desired rate to the clock input terminal 147 of the sequence generator 141. This clock signal steps the generator 141 through three-bit binary gate word sequence.

Each time a delayed sync recognition signal is received, the sequence generator 141 is set to issue a three-bit binary gate word 111. Since each of the lines 142 carries a logical "1" state signal, the transmission gates 131, 133 and 135 are enabled to transmit the digital information, which are data bits, received on channels 17–19. The transmission gate 140 is also enabled by the operation of the AND gate 148 having its three inputs coupled directly to the lines **142*a*, 142*b* and 142*c*. The gate word 111 causes the AND gate 148 to issue an enabling signal to the gate input of the transmission gate 140. The enabled transmission gate 140 transmits the sync word bits received on channel 20 to the same channel at the output of the separator 27. Because at least one gate input of each of the remaining transmission gates 132, 134 and 136–139 is coupled to the lines 142 through one of the inverters 149–151, these remaining transmission gates are disabled by the three-bit binary gate word 111**.

The three clock signals received by the sequence generator 141 from the divider 146 following the delayed sync recognition signal steps the generator 141 to issue successively the three-bit binary gate words 000, 001, and 011. Like the sequence generator 41 of the sync-word distributor 23 embodiment of FIG. 3, the sequence generator 141 is conveniently arranged to issue a finite series of binary numbers.

When the first clock signal following the delayed sync recognition signal is issued by the divider 146, the sequence generator 141 issues the three-bit binary gate word 000. Since each of the lines 142 carries a logical "0" state signal, all of the transmission gates 131, 133, 135 and 140 are disable, transmission gate 140 because AND gate 148 issues a disabling signal. However, the transmission gates 137, 138 and 139 are enabled because their gate inputs receive enabling logical "1" state signals from the inverters 149–151. In addition, the AND gate 152 receives logical "1" state signals from these inverters, thereby, causing the AND gate to issue an enabling signal to the gate input of the transmission gate 132. The remaining transmission gates 131, 133–136 and 140 are disabled because at least one gate input of each of the gates receives a disabling logical "0" state signal. With the transmission gates 131–140 in these states, the digital information received on channel 17, which at this time are sync bits, are redistributed through transmission gate 132 to channel 20 at the output of the separator 27. The digital information, or data bits, in the other channels 18–20 are redistributed respectively through transmission gates 137, 138 and 139 to the respective adjacent channels 17–19 at the output of the separator 27. Hence, the distributed data and sync bits of the second four parallel stream bit periods following the appearance of the sync word in channel 17 are redistributed to their original channels.

Upon receipt of the second clock signal from the divider 146 following the delayed sync recognition signal, the sequence generator 141 is set to issue the third of the sequence of gate words or 001. At this time, the sync word separator 27 receives sync word bits from channel 18 and data bits from channels 17 and 19–20. With the generator 141 set in the above condition, a logical "1" state signal is placed on line **142*a* and logical "0" state signals on lines 142*b* and 142*c*. The logical "1" state signal enables transmission gate 131 and, through the operation of the inverter 149, disables the transmission gates 132 and 137. Thus, data bits received from channel 17 at the input of the separator 27 are transmitted to the same channel at the output of the separator 27. Since logical "0" state signals are present on lines 142*b* and 142*c*, the transmission gates 133, 135 and 140 that transmit the digital information from channels 18–20 at the input of the separator 27 to the same channels at the output are disabled. However, the logical "0" state signals on lines 142*b* and 142*c* are coupled through inverters 150 and 151 to the gate inputs of the transmission gates 138 and 139. Hence, these gates are enabled. Furthermore, the inputs of the AND gate 153 receive the logical "1" state signal from the line 142a and the inverted, therefore, logical "1" state signals from the inverters 150 and 151. Thus, the AND gate 153 issues an enabling signal to the gate input of the transmission gate 134. The other transmission gate 136 is disabled by the disabling output of the AND gate 154**.

With the transmission gates 131–140 in the foregoing states, the data bits received on channels 19 and 20 are redistributed through transmission gates 138 and 139 to channels 18 and 19, respectively, at the output of the separator 27 while sync bits received on channel 18 are redistributed through transmission gate 134 to channel 20. As discussed hereinbefore, the data bits received on channel 17 are transmitted to the same channel at the output of the separator 27.

The third clock signal received from the divider 146 following the delayed sync recognition signal sets the sequence generator 141 to issue the fourth and last of the sequence of gate words, or 011. At this time, the sync word separator 27 receives sync word bits from channel 19 and data bits from channels 17–18 and 20. The sequence generator 141 places logical "1" state signals on lines **142*a* and 142*b* and a logical "0" state signal on line 142*c*. The logical "1" state signals enable the transmission gates 131 and 133 and, through the operation of the inverters 149 and 150, disable the transmission gates 132, 134, 137, 138 and 140. Thus, data bits received from channels 17 and 18** at the input of the separator 27 are transmitted to the same channels at the output. The logical "0" state signal present on line 142c results in the exchange of sync bits received from channel 19 with the data bits received from channel 20 so that they appear respectively in channels 20 and 19 at the output of the separator 27. The logical "0" state signals causes, through the operation of the inverter 151, the transmission gate 139 to be enabled. This gate receives the data bits from channel 20 and transmits them to channel 19 at the output of the separator 27. At the same time, the logical "0" state signal disables the transmission gate 135. The transmission gate 136 also is enabled by the operation of the AND gate 154 to transmit the sync word bits received from channel 19 to the channel 20 at the output of the separator 27. The AND gate 154 issues an enabling signal in response to the logical "1" state signals present on lines 142a and 142b and the inverted, therefore, logical "1" state signal output by the inverter 151.

The next clock signal issued by the divider 146 is received by the sequence generator 141 simultaneously with the second sync recognition signal issued by the sync detector 111 of the data processing channel 101. The sequence generator 141 is set by the sync recognition signal to issue the first three-bit binary gate word of the sequence and, therefore, its operation is dominated by the sync recognition signal rather than the clock signal. Since the operation of the time displacement corrector 26 is referenced to the occurrence of the sync word in channel 17 and the sequence generator 141 is also controlled by the occurrence of this sync word, the operation of the sync word separator 27 is properly synchronized to the operation of time displacement corrector 26, hence, occurrence of the sync word in the channels 17–20.

To transfer the data and sync bits transmitted by transmission gates 131–140 to the correct channels 17–20 at the output of the separator 27, OR gates 156–159 are provided. The OR gate 156 couples the outputs of the transmission gates 131 and 137 to the channel 17. The outputs of the transmission gates 133 and 138 are coupled to the channel 18 by the OR gate 157. The OR gate 158 couples the outputs of the transmission gates 135 and 139 to the channel 19. The OR gate 159 couples the outputs of the transmission gates 132, 134, 136 and 140 to the channel 20. A shift register may be coupled to the OR gates 156–159 to facilitate transferring the digital bits onto the channels 17–20 at the output of the separator 27. If such a register is employed, it would be arranged like the register 46 of the sync word distributor 23.

The sync-word separator 27 embodiment of FIG. 8 is employed to redistribute the data and sync bits in the channels 17–20 when the sync-word distributor 23 embodiment of FIG. 4 is employed. This sync-word distributor embodiment is very similar to the embodiment of FIG. 7, differing only in the three-bit binary gate word sequence issued by the sequence generator 141' and the arrangement of the logical circuits. In this embodiment, each of the channels 17–19 is coupled to the signal inputs of one of the pairs of transmission gates 161 and 162, 163 and 164, and 165 and 166. One transmission gate of each pair (i.e., 161, 163, and 165) serves to couple the data bits received on a channel to the same channel at the output of the separator 27. The other transmission gate of each pair (i.e., 162, 164 and 166) couples the sync bits received on the channels 17–19 to the channel 20 at the output of the separator 27. The transmission gate 170 is operated to couple the sync bits received on channel 20 to the same channel at the output of the separator 27. The remaining transmission gates 167–169 are operated to couple data bits received on channel 20 to their original channels 17–19 at the output of the separator 27. Each of the pairs of transmission gates 161 and 162, 163 and 164, and 165 and 166 together with one of the transmission gates 167–169 have their gate inputs coupled to one of the lines 171 so that each pair and its associated transmission gate 167, 168 or 169 are controlled by the same gate signal provided by the sequence generator 141'. The gate inputs of the transmission gates 162 and 164 and 166–169 are coupled through inverters 172–174 so that these gates are always in states opposite their associates gates 161, 163 and 165.

The gate inputs of the transmission gates 161–170 are provided with and controlled by the gate word bits generated by the sequence generator 141' and associated logical control circuits so that when the sync word appears in channel 20 at the input of the separator 27, the bits in the channels 17–20 at the input are coupled to the same channels at the output. However, when the sync word appears in channel 17 at the input of the separator 27, the transmission gates 161–170 are controlled to couple the sync word bits to channel 20 and a corresponding number of data bits received from channel 20 to channel 17 at the output of the separator 27. When the sync word appears in channel 18 at the input of the separator 27, the transmission gates 161–170 are controlled to exchange the sync word bits with a corresponding number of data bits received from channel 20 so that the sync word appears in channel 20 and the date bits in channel 18 at the output of the separator 27. Likewise, when the sync word appears in channel 19 at the input of the separator 27, the transmission gates 161–170 are controlled to exchange the sync word with data bits received from channel 20 in the manner described hereinabove.

The transmission gates 161–170 are controlled by a three-bit binary gate word provided by the sequence generator 141'. The generator 141' is controlled by the delayed sync recognition signal and clock signal obtained from the data processing channel 101 of the time displacement corrector 26 in the manner identical to that of the embodiment of FIG. 7. The generator 141' provides a sequence of four three-bit binary gate words on lines 171. Each binary gate word of the sequence lasts a sync word period or four parallel stream bit periods. Each time a delayed sync recognition signal is received at the set input terminal 143', the sequence generator 141' is set to issue a three-bit binary gate word 111. Since each of the lines 171 carries a logical "1" state signal, the transmission gates 161, 163, 165 are enabled to transmit the digital information received on channels 17–19. As in the separator 27 embodiment of FIG. 7, the receipt of the delayed sync recognition signal is synchronized with the occurrence of the sync word in the bit stream received from channel 20. Therefore, the information received on channels 17–19 are data bits. The transmission gate 170 is also enabled by the operation of an AND gate 176 having its three inputs coupled directly to the lines 171*a*, 171*b*, and 171*c*. The gate word 111 causes the AND gate 176 to issue an enabling signal to the gate input of the transmission gate 170. The enable transmission gate 170 transmits the sync word bits received on channel 20 to the same channel at the output of the separator 27. The remaining transmission gates 162, 164 and 166–169 are disabled because their gate inputs are coupled through one of the inverters 172–174 to the lines 171.

The three clock signals received at the clock input terminal 147' following the delayed sync recognition signal steps the generator 141' to issue successively the three-bit binary gate words 110, 101 and 011. Hence, the sequence generator 141' is stepped to issue successively one logical "0" state signal on each of the lines 171*a*, 171*b* and 171*c*. A logical "0" state signal is placed on line 171*a* when the sync word is received from channel 17. This logical state signal condition disables transmission gates 161 and 170 while enabling the associated transmission gates 162 and 167. The other transmission gates are placed in the same states they were in when the three-bit binary gate word 111 is issued. Thus, the data bits received from channel 20 are redistributed through the transmission gate 167 to the channel 17 while the sync word bits received from channel 17 are redistributed through the transmission gate 162 to the channel 20 at the output of the separator 27. Data bits from channels 18 and 19 remain in those channels for a sync word interval.

A logical "0" state signal is placed on line 171*b* when the sync word is received from channel 18. This logical state signal condition disables the transmission gates 163 and 170 while enabling the associated transmission gates 164 and 168. The other transmission gates are placed in the state they are in when the three-bit binary gate word 111 is issued. With the transmission gates in these states, the data bits received from channel 20 are redistributed through the transmission gate 168 to the channel 18 and the sync word bits received from channel 18 are redistributed through to transmission gate 164 to the channel 20 at the output of the separator 27. Data from channels 17 and 19 remain in those channels for this sync word interval.

A logical "0" state signal is placed on line 171*c* when the sync word is received from channel 19. This logical state signal condition disables the transmission gates 164 and 170 and enables the transmission gates 166 and 169. Since the other lines 171*a* and 171*b* have logical "1" state signals thereon, the other transmission gates are placed in the states they are in when the three-bit binary gate word 111 is issued. Thus, the data bits received from channel 20 is redistributed through the transmission gate 169 to channel 19 and to sync word bits received from channel 19 are redistributed through the transmission gate 166 to the channel 20 at the output of the separator 27. Data from channel 17 and 18 remain in those channels for this sync word interval.

The fourth clock signal received by the sequence generator 141' is coincident with the second sync recognition signal received by the generator. As in the sync-word separator embodiment of FIG. 7, this initiates a new three-bit binary gate word sequence.

To transfer the data and sync bits transmitted by the transmission gates 161–170 to the correct channels 17–20 at the output of the separator 27, the outputs of the transmission gates 161 and 167, 162 and 168, 163 and 169, and 162, 164, 166 and 170 are coupled respectively to one of the OR gates 156–159.

The time correlated and redistributed data bits from the sync-word separator 27 are then ready for transmission over data channels 16 to the parallel to serial converter 28, which functions to restore the serial bit stream as it was at the input terminal 12 of the multitrack digital recorder/reproducer system 11.

What is claimed is:

1. A method of correcting interchannel time displacements between time related streams of digital data contained in *n* separate and parallel channels comprising:

generating a sequence of a unique repeated digital sync word in at least one other channel;

sequentially distributing the digital data and the repeated digital sync words in each of the *n* plus other separate and parallel channels;

detecting in each of the *n* plus other channels the unique digital sync word; and relatively time displacing the distributed digital data and digital sync words in the n plus other channels in response to the detection of the unique digital sync word to eliminate any interchannel time displacements.

2. The method according to claim 1 wherein each of the *n* plus other channels have equal amounts of sequentially distributed digital data and digital sync words so that the digital sync words occur at the same regular intervals in each of the channels and the digital sync words in each channel are time displaced relative to those in the other of the *n* plus other channels.

3. The method according to claim 1 wherein the digital data is at a certain clock rate, and the digital data and sync words are distributed in the n plus other separate and parallel channels without changing the clock rate of the digital data.

4. The method according to claim 1 further including the step of redistributing the digital data and digital sync words in the *n* plus other channels following any relative time displacing to insert the digital data in the original bit positions of the streams in the *n* seperate and parallel channels they were in prior to distribution.

5. The method according to claim 1 wherein the digital data and the repeated digital sync words are distributed by inserting at least one sync word sequentially in each of the *n* plus other channels, and transferring a corresponding amount of digital data from the *n* channels to one of the other *n* plus other channels each time a sync word is inserted in one of the *n* channels.

6. The method according to claim 5 wherein the *n* plus other channels include *n* spacially adjacent data channels and one other spacially adjacent sync channel, and the digital data and the repeated digital sync words are distributed by transferring the corresponding amount of digital data from the *n* channels to an immediately adjacent one of the ($n$+1) channels.

7. The method according to claim 5 wherein the *n* plus other channels include *n* data channels and one other sync channel, and the digital data and the repeated digital sync words are distributed in each of the (n+1) channels by transferring a corresponding amount of digital data from the data channel to the sync channel each time a sync word is inserted in a data channel whereby the sync channel includes a sequence including digital data from each of the *n* data channels and a sync word from the sync channel.

8. The method according to claim 1 wherein the digital data is in the form of binary bits and the digital sync word includes a selected number of binary bits in a unique sequence, and the data bits and sync bits are distributed in each of the *n* plus other channels by transferring a corresponding number of data bits from the *n* channel to one of the other *n* plus other channels each time the selected number of sync bits forming a unique sync word is inserted in one of the *n* channels.

9. In an interchannel time displacement corrector for eliminating time displacements from time related streams of digital data contained in *n* separate and parallel channels, the combination comprising:

a source of *n* parallel channels of time related digital data;

means for generating a sequence of a unique repeated digital sync word in at least one other channel; and means for distributing the digital data and the repeated digital sync words in each of the *n* plus other separate and parallel channels.

10. In the time displacement corrector according to claim 9 wherein the parallel channels of distributed digital data and digital sync words are simultaneously transmitted to a receiver further comprising:

means for detecting the received unique digital sync word in each of the *n* plus other channels of transmittal digital data and digital sync words;

means for relatively time displacing the received distributed digital data and digital sync words in the *n* plus other channels in response to the detection of the unique digital sync words to align the sync words in their original relative time positions prior to transmission to eliminate any interchannel time displacements; and means for redistributing the aligned digital data and digital sync words to insert the digital data in the original bit positions of the streams in the *n* separate and parallel channels they were in prior to distribution.

11. In the time displacement corrector according to claim 10 further comprising:

a multitrack magnetic recorder/reproducer system for simultaneously recording and reproducing a plurality of separate streams of digital data;

means for coupling the n plus other separate and parallel streams of distributed digital data and digital sync words to the multitrack system for simultaneously recording each stream along a track of said multitrack system; and means for coupling the n plus other separate and parallel streams of distributed data and digital sync words simultaneously reproduced from the tracks of said multitrack system to the sync word detecting means.

* * * * *